United States Patent
Jeong et al.

(10) Patent No.: US 9,319,723 B2
(45) Date of Patent: Apr. 19, 2016

(54) APPARATUS AND METHOD FOR TRANSMITTING SIGNAL IN DIGITAL VIDEO BROADCASTING SYSTEM

(71) Applicant: Samsung Electronics Co., Ltd., Suwon-si, Gyeonggi-do (KR)

(72) Inventors: Hong-Sil Jeong, Suwon-si (KR); Seho Myung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/255,241

(22) Filed: Apr. 17, 2014

(65) Prior Publication Data

US 2014/0317667 A1    Oct. 23, 2014

(30) Foreign Application Priority Data

Apr. 18, 2013   (KR) .................. 10-2013-0042746

(51) Int. Cl.
*H04L 27/00* (2006.01)
*H04N 21/2383* (2011.01)

(52) U.S. Cl.
CPC .................. *H04N 21/2383* (2013.01)

(58) Field of Classification Search
CPC . H04L 1/0071; H04L 1/0042; H03M 13/271; H03M 13/6525; H04N 21/2383
See application file for complete search history.

(56) References Cited

U.S. PATENT DOCUMENTS

| 2003/0079170 | A1* | 4/2003  | Stewart et al. ............... 714/755 |
| 2005/0248473 | A1* | 11/2005 | Kukla ................. H03M 13/271 341/50 |
| 2009/0100300 | A1* | 4/2009  | Kim .................... H03M 13/271 714/702 |
| 2012/0327306 | A1  | 12/2012 | Jeong et al. |
| 2013/0166992 | A1* | 6/2013  | Shinohara et al. ............ 714/766 |
| 2014/0129895 | A1* | 5/2014  | Petrov ............... H03M 13/1142 714/752 |

FOREIGN PATENT DOCUMENTS

KR   10-2013-0001013 A   1/2013

* cited by examiner

*Primary Examiner* — Syed Haider
(74) *Attorney, Agent, or Firm* — Jefferson IP Law, LLP

(57) ABSTRACT

A method for bit-interleaving coded bits for Incremental Redundancy (IR) transmission in a transmission apparatus of a digital video broadcasting system is provided. The method includes sequentially writing the coded bits in a memory area having a predetermined size, reading the coded bits written in the memory area based on a reading order that is differently set for each of normal transmission and at least one IR transmission, and outputting one coded systematic bit stream interleaved for the normal transmission and at least one coded parity bit stream interleaved for at least one IR transmission.

13 Claims, 11 Drawing Sheets

APPARATUS AND METHOD FOR TRANSMITTING SIGNAL IN DIGITAL VIDEO BROADCASTING SYSTEM

CROSS-REFERENCE TO RELATED APPLICATION(S)

This application claims the benefit under 35 U.S.C. §119 (a) of a Korean patent application filed on Apr. 18, 2013 in the Korean Intellectual Property Office and assigned Serial number 10-2013-0042746, the entire disclosure of which is hereby incorporated by reference.

TECHNICAL FIELD

The present disclosure relates to a transmission apparatus and method for interleaving a signal to be transmitted in a digital video broadcasting system.

BACKGROUND

Generally, the link performance in a wireless communication system may be degraded due to the noise, fading, Inter-Symbol Interference (ISI) and the like.

In order to improve the link performance in the wireless communication system, development of technology for overcoming the noise, fading, ISI and the like is needed. Particularly, in a high-speed digital communication system requiring high data throughput and reliability, such as the next-generation mobile communication, digital broadcasting, mobile Internet and the like, development of technology for overcoming the noise, fading, ISI and the like is required.

The typical technology proposed in response to the above-described requirements is a Forward Error Correction (FEC) technique that is based on an error-correcting code.

The FEC technique supports error detection and error correction by adding parity bits to systematic bits. The FEC technique is the typical scheme for increasing the reliability of communication by efficiently recovering distorted information. Examples of the error-correction code for the FEC technique may include a turbo code, a Low-Density Parity-Check (LDPC) code, and the like.

In the digital communication system, the communication reliability may be improved to some extent by applying the FEC technique. However, not all errors can be corrected or recovered. Particularly, in the case of broadcasting, errors may or may not be corrected depending on the location where the broadcast is received, or whether the broadcast is fixed broadcast or mobile broadcast. If a code rate is determined where the received broadcast is worst, the coding complexity may be unnecessarily high in the areas where the broadcast is well received. Hence, if Incremental Redundancy (IR) is used, the efficiency may increase. Therefore, in order to obtain higher communication reliability in the digital communication system, IR should be available so that the broadcast may be efficiently received under any circumstances.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for generating channel coded data that is interleaved with Incremental Redundancy (IR) in a digital video broadcasting system.

Another aspect of the present disclosure is to provide an apparatus and method for generating a modulated symbol stream corresponding to at least one IR in a digital video broadcasting system.

Another aspect of the present disclosure is to provide an apparatus and method for performing bit interleaving on coded bits generated by channel encoding to support IR in a digital video broadcasting system.

Another aspect of the present disclosure is to provide an apparatus and method for generating a plurality of interleaved coded data streams to support IR using different reading orders by sharing coded data written in a memory area in a digital video broadcasting system.

Another aspect of the present disclosure is to provide an apparatus and method for setting different reading orders to generate a plurality of interleaved coded data streams to support IR from coded bits written in one memory area in a digital video broadcasting system.

Another aspect of the present disclosure is to provide an apparatus and method for partitioning a predetermined number of columns of a memory area, having coded bits that are written for interleaving, into a set number of partitions, and performing interleaving based on a reading order of the partitions in a digital video broadcasting system.

Another aspect of the present disclosure is to provide an apparatus and method for partitioning a predetermined number of rows defining a memory area, in which coded bits are written for interleaving, into a set number of partitions, and performing interleaving based on a reading order of the partitions in a digital video broadcasting system.

In accordance with an aspect of the present disclosure, a method for bit-interleaving coded bits for IR transmission in a transmission apparatus of a digital video broadcasting system is provided. The method includes sequentially writing the coded bits in a memory area having a predetermined size, reading the coded bits written in the memory area based on a reading order that is differently set for each of normal transmission and at least one IR transmission, and outputting one coded systematic bit stream interleaved for the normal transmission and at least one coded parity bit stream interleaved for at least one IR transmission.

In accordance with another aspect of the present disclosure, a transmission apparatus for bit-interleaving coded bits for IR transmission in a digital video broadcasting system is provided. The transmission apparatus includes an interleaver configured to sequentially write the coded bits in a memory area having a predetermined size, read the coded bits written in the memory area based on a reading order that is differently set for each of normal transmission and at least one IR transmission, and output one coded systematic bit stream interleaved for the normal transmission and at least one coded parity bit stream interleaved for at least one IR transmission.

In accordance with further another aspect of the present disclosure, an apparatus for generating data in a digital video broadcasting system is provided. The apparatus includes an encoder configured to encode input data, an interleaver configured to interleave bits encoded by the encoder, and a modulator configured to modulate coded bits interleaved by the interleaver. The interleaver may include a memory including a writing area having a predetermined number 'c' of columns and a predetermined number 'r' of rows, and a controller configured to write the coded bits in the memory based on a writing order that is defined by a column index ($N_c$, $0 \le N_c < c$)

corresponding to the predetermined number 'c' of columns and a row index ($N_r$, $0 \leq N_r < r$) corresponding to the predetermined number 'r' of rows, and output coded bits written in the memory in a reading order that is assigned to each column or row partition determined by partitioning the columns or the rows considering a read direction of coded bits written in the memory.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
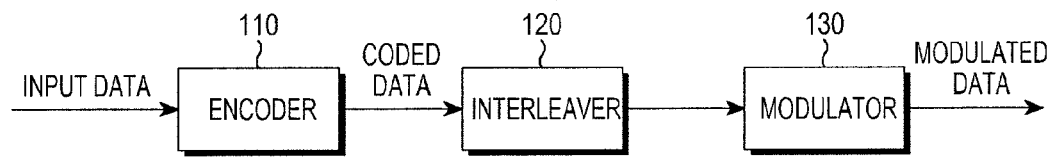
FIG. 1 illustrates a block diagram of a transmission apparatus supporting a Forward Error Correction (FEC) technique in a typical wireless communication system.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In a below-described embodiment of the present disclosure, bit interleaving in a digital video broadcasting system will be considered and a method of generating a modulated symbol stream corresponding to Incremental Redundancy (IR) that is based on the bit interleaving will be provided.

Herein, IR is not provided to retransmit specific missing data due to the existence of a feedback from a receiving side, but to select and transmit at least one parity data stream and one systematic data stream that is applied to a broadcasting system and interleaved and output in a transmitting side without a feedback from the receiving side. Therefore, in the following detailed description, interleaved output data will be separately referred to as 'interleaved systematic data' and 'interleaved parity data', for convenience of description only.

To this end, the structure of a bit interleaver that can be provided to generate a modulated symbol stream corresponding to IR (hereinafter referred to as a 'modulated parity symbol stream') will be described and an interleaving operation based on the structure will also be described in detail. The interleaving operation will correspond to generating different transmission coded bit streams by interleaving of systematic data (hereinafter referred to as 'systematic data transmission') for transmission and interleaving of at least one parity data (hereinafter referred to as 'parity data transmission') for transmission. For example, various embodiments will be provided in which interleaving is performed to transmit different coded bits during systematic data transmission and during at least one parity data transmission.

An embodiment of the present disclosure will be described in detail with reference to the accompanying drawings.

FIG. 1 illustrates a block diagram of a transmission apparatus supporting a Forward Error Correction (FEC) technique in a typical wireless communication system.

Referring to FIG. 1, only the components involved in FEC support among the components of the transmission apparatus are illustrated for convenience of description only.

Referring to FIG. 1, an encoder 110 may encode input data at a given code rate using a predetermined error-correcting code. The predetermined error-correcting code, which is a code supporting FEC, may be a turbo code, a Low-Density Parity-Check (LDPC) code, and the like. The code rate may be changed between 0 and 1 (0<R<1) based on the channel conditions and the like. For example, the code rate may be determined as a value closer to 1 as the channel conditions are better, and may be determined as a value closer to zero (0) as the channel conditions degrade. Typically, a code rate applied for FEC may include ¾, ½, ¼ and the like.

By encoding the input data, the encoder 110 may output a coded bit stream including systematic bits and redundant bits (or parity bits) at the given code rate. The coded bit stream may be referred to as 'coded data'.

An interleaver 120 may interleave the coded bit stream provided from the encoder 110 using a preset interleaving pattern. The interleaving may be performed to prevent burst errors which may occur in a wireless channel. In other words, if a coded bit stream is transmitted after undergoing interleaving, a receiving side may convert the burst errors which occurred during transmission into random errors, making it possible to easily perform error correction.

The interleaving pattern may be set in advance considering the type, target and the like of the interleaving to be applied.

A modulator 130 may perform modulation on the interleaved coded bit stream from the interleaver 120 using a preset modulation scheme and output modulated symbols. The modulated symbols may be referred to as 'modulated data'

The modulation scheme may be set in advance considering the channel conditions and the like. Typically, as for the modulation scheme, a higher-order modulation scheme may be set if the channel conditions are better and a lower-order modulation scheme may be set if the channel conditions are worse. For example, the modulation scheme may include Quadrature Phase Shift Keying (QPSK), 16-ary Quadrature Amplitude Modulation (16-QAM), 64-QAM, 256-QAM, and the like.

Figure 2:
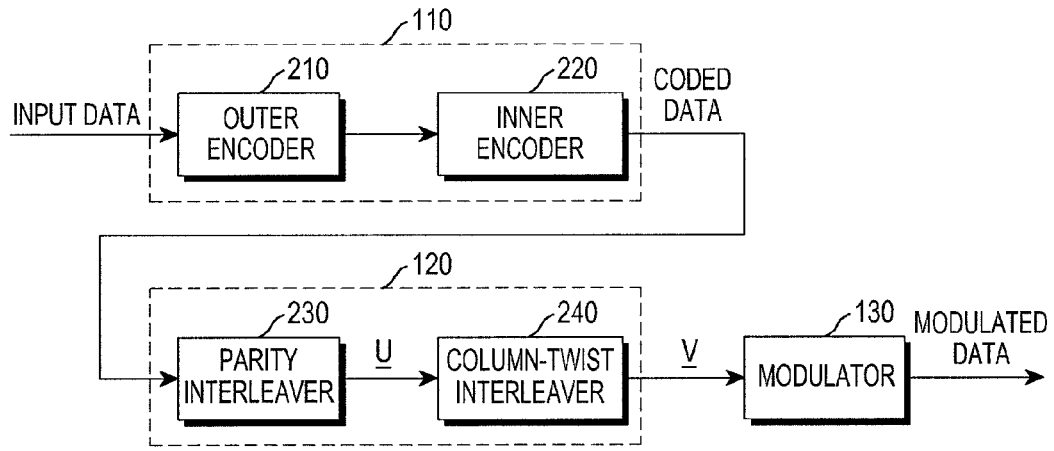
FIG. 2 illustrates a block diagram of a transmission apparatus supporting an FEC technique in a general broadcasting communication system according to an embodiment of the present disclosure.

FIG. 2 illustrates a block diagram of a transmission apparatus supporting an FEC technique in a general broadcasting communication system according to an embodiment of the present disclosure.

For example, the broadcasting communication system may include Digital Video Broadcasting-2nd Generation Terrestrial (DVB-T2), DVB-Next Generation Handheld (DVB-NGH) and the like, as a communication system supporting broadcast services. In FIG. 2, only the components involved in FEC support in the transmission apparatus of a DVB-T2 system among the broadcasting communication systems are illustrated for convenience of description only.

Referring to FIG. 2, the transmission apparatus may configure an encoder 110 with two encoders such as an outer encoder 210 and an inner encoder 220 for concatenation encoding. The outer encoder 210 may perform encoding on input data using a Bose, Chaudhuri, Hocquenghem (BCH) code. The inner encoder 220 may perform encoding on the output data from the outer encoder 210 using an LDPC code.

A bit interleaver 120 may perform interleaving on the coded data from the inner encoder 220 using a set factor. For example, the set factor may include the number '$N_r$' of rows and the number '$N_c$' of columns, which are used to determine the structure of a bit interleaver (e.g., the size of recording media for bit interleaving). The number '$N_r$' of rows and the number '$N_c$' of columns may be differently set depending on the modulation scheme.

Table 1 below illustrates an example of the number '$N_r$' of rows and the number '$N_c$' of columns, which will be applied depending on each modulation scheme.

TABLE 1

| Modulation | Rows $N_r$ | | Columns |
| | $N_{ldpc}$ = 64,800 | $N_{ldpc}$ = 16,200 | $N_c$ |
| --- | --- | --- | --- |
| 16-QAM | 8,100 | 2,025 | 8 |
| 64-QAM | 5,400 | 1,350 | 12 |
| 256-QAM | 4,050 | — | 16 |
| | — | 2,025 | 8 |

The bit interleaver 120 may include a parity interleaver 230 and a column-twist interleaver 240. However, the parity interleaver 230 may or may not be applied depending on the situation. In other words, the parity interleaver 230 may be selectively applied depending on the circumstances of the system.

Referring to FIG. 2, the output of the parity interleaver 230 is represented by U and the output of the column-twist interleaver 240 is represented by V.

A modulator 130 may modulate the coded bit stream interleaved by the bit interleaver 120 using a predetermined modulation scheme, thereby outputting modulated symbols.

Figure 3:
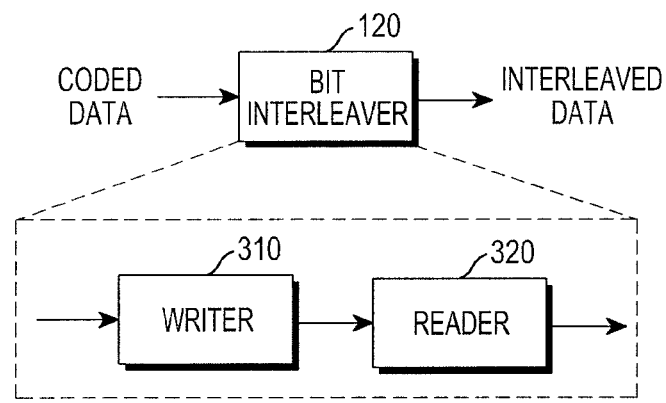
FIG. 3 illustrates a block diagram of the bit interleaver in FIG. 2 according to an embodiment of the present disclosure.

FIG. 3 illustrates a block diagram of the bit interleaver 120 in FIG. 2 according to an embodiment of the present disclosure.

Referring to FIG. 3, the bit interleaver 120 may interleave input coded data and output an interleaved coded bit stream (e.g., interleaved data). The bit interleaver 120 may include a writer 310 and a reader 320. The writer 310 may store (or write) the input coded data in a predetermined writing order. The reader 320 may output (or read) the written coded data in a predetermined reading order.

Although not illustrated in the drawing, it will be apparent to those of ordinary skill in the art that a memory used for writing coded data is provided in the writer 310. For example, as for the memory for interleaving, an independent memory may be used integral to the bit interleaver 120 or a memory block may be partially allocated in the system memory.

The structure illustrated in FIG. 3 may support an operation of the bit interleaver 120 that includes the parity interleaver 230 and the column-twist interleaver 240 in FIG. 2. In other words, it will be apparent to those of ordinary skill in the art that the writer 310 and the reader 320 in FIG. 3 may perform operation of the parity interleaver 230 and an operation of the column-twist interleaver 240 by changing the writing order, the reading order, and the memory area.

Figure 4:
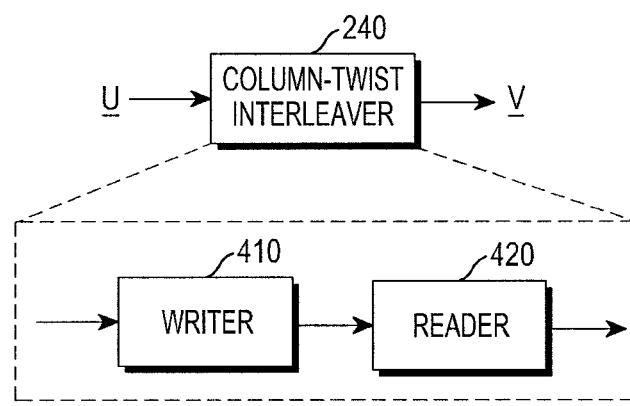
FIG. 4 illustrates a block diagram of the column-twist interleaver constituting the bit interleaver in FIG. 2 according to an embodiment of the present disclosure.

FIG. 4 illustrates a block diagram of the column-twist interleaver 240 constituting the bit interleaver 120 in FIG. 2 according to an embodiment of the present disclosure.

Referring to FIG. 4, the column-twist interleaver 240 may perform interleaving on the output U (or coded data) of the parity interleaver 230 and output interleaved data V. To this end, the column-twist interleaver 240 may include a writer 410 and a reader 420.

The writer 410 may store (or write) the received output U (or coded data) of the parity interleaver 230 in a predetermined writing order. The reader 420 may output (or read) the written output U (or coded data) of the parity interleaver 230 in a predetermined reading order. The output data corresponds to the interleaved data V.

The bit interleaver 120 illustrated in FIG. 3 and the column-twist interleaver 240 illustrated in FIG. 4 may be different from each other in terms of the writing order, the reading order and the like, but may be substantially identical to each other in terms of the interleaving operation.

Figure 5:
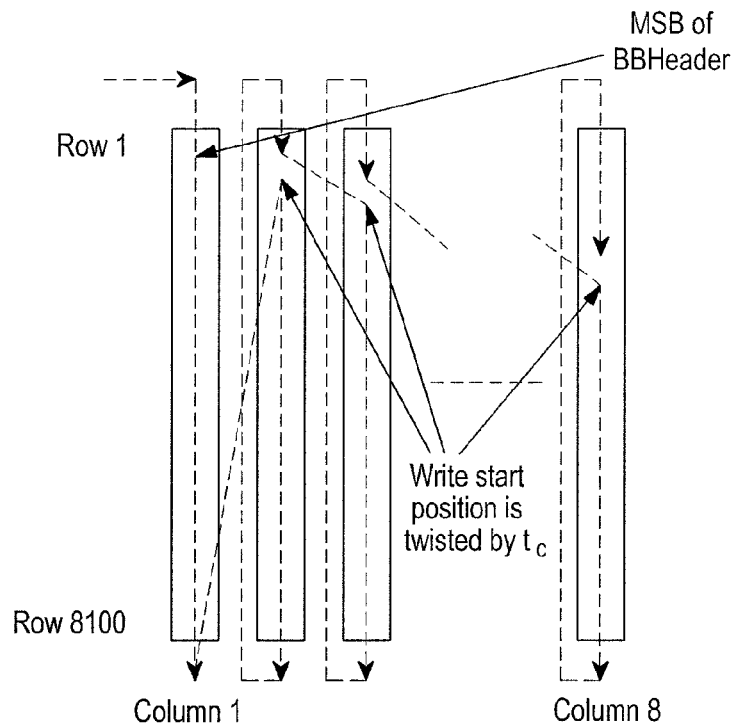
FIG. 5 illustrates an example of an operation of a writer for interleaving according to an embodiment of the present disclosure.
Figure 6:
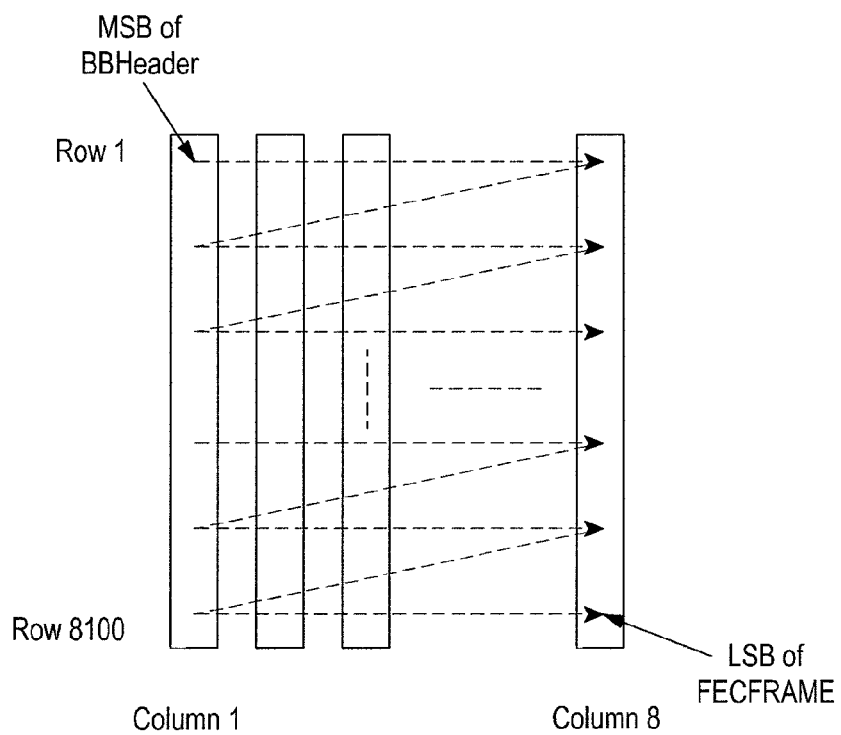
FIG. 6 illustrates an example of an operation of a reader for interleaving according to an embodiment of the present disclosure.

FIG. 5 illustrates an example of an operation of a writer for interleaving according to an embodiment of the present disclosure and FIG. 6 illustrates an example of an operation of a reader for interleaving according to an embodiment of the present disclosure.

Referring to FIGS. 5 and 6, FIG. 5 illustrates an operation of a writing operation for bit interleaving in the DVB-T2 system and FIG. 6 illustrates an example of a reading operation for bit interleaving performed in the DVB-T2 system.

In the following description made with reference to FIGS. 5 and 6, a bit interleaving operation in a transmission apparatus in which a normal FEC frame is output by encoding and that uses a 16-QAM modulation scheme will be considered. In this case, it can be noted from Table 1 that the number '$N_c$' of rows for bit interleaving is 8,100, and the number '$N_c$' of columns for bit interleaving is 8.

Reference will be made to FIG. 5 to describe an example of an operation of writing coded bits in a writing area having 8,100 rows and 8 columns. It is noted that the writing order of coded bits is indicated by a dotted line.

The writing operation may be sequentially performed for 8 columns. In other words, coded bits may be sequentially written in positions corresponding to all of 8,100 rows of the first column. If the writing for the first column is completed, the writing of coded bits for the next column may be performed. In other words, coded bits may be sequentially written in positions corresponding to 8,100 rows of the second column. It is preferable that the coded bits written in the first row of the second column are continued until the last row of the second column.

The above-described writing of coded bits will be performed in the same way for up to the eighth column (or the last column).

A column-twist interleaver may independently determine a write start position of each row considering a column twist factor $t_c$, when writing coded bits in each row. Therefore, a write start position of each row may be different from each other.

Table 2 below illustrates an example of a column twist factor (or twisting parameter) $t_c$ that is set for each of various modulation schemes.

area for interleaving and a length $N_{ldpc}$ (e.g., the number '$N_r$' of rows) of an LDPC code in addition to the modulation scheme.

Therefore, when the column twisting interleaving scheme is applied, writing of coded bits for each column may be performed for up to the position corresponding to the last row, while beginning at the write start position determined by the column twist factor $t_c$. Thereafter, writing of coded bits may be performed for up to the position before the write start position of the first row of the column.

Reference will be made to FIG. 6 to describe an example of an operation of reading and outputting coded bits written in a writing area having 8,100 rows and 8 columns in a predetermined order. It is noted that the reading order of written coded bits is indicated by a dotted line.

The reading operation may be sequentially performed for 8,100 rows. In other words, coded bits written in positions of all of 8 columns constituting the first row among 8,100 rows may be sequentially read and output.

If the coded bits written in the first row have been read and output, coded bits written in positions corresponding to 8 columns in the second row may be sequentially read and output. It is preferable that the coded bits read from the last column of the first row and the coded bits read from the first column of the second row are continuously output.

The operation of reading and outputting coded bits as described above will be performed in the same way for up to the 8,100-th row (or the last row).

Therefore, the coded bit stream (e.g., interleaved coded bit stream) that is output after interleaving may correspond to a coded bit stream that is sequentially output beginning at the coded bit corresponding to the Most Significant Bit (MSB) of a Base-Band (BB) header up to the coded bit corresponding to the List Significant Bit (LSB) of the FEC frame in the writing area for interleaving.

Figure 7:
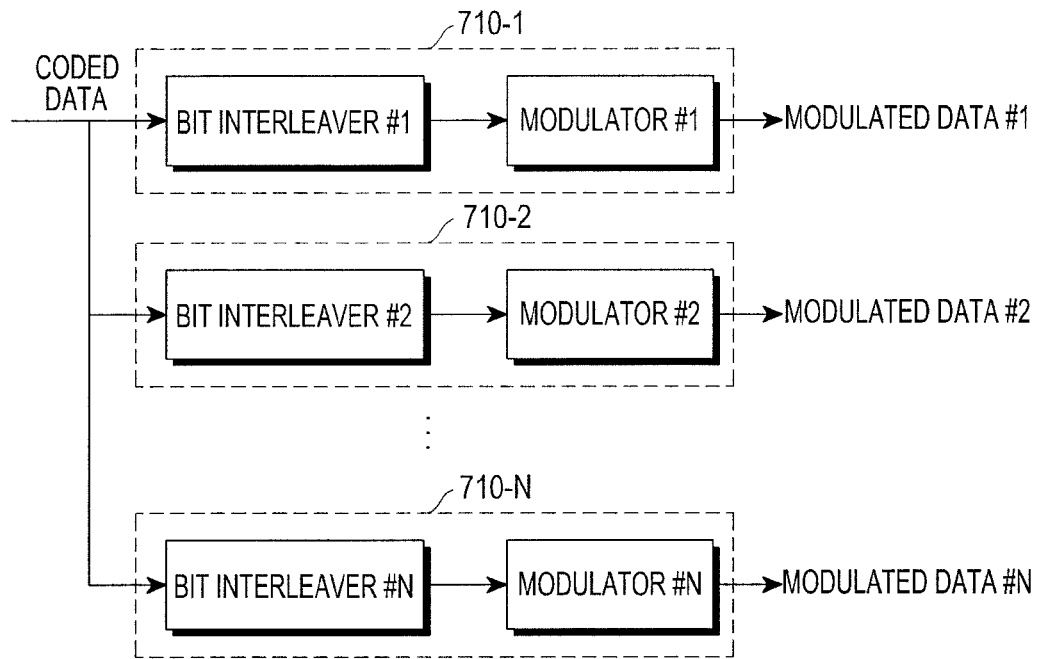
FIG. 7 illustrates an example in which bit interleaving is applied for Incremental Redundancy (IR) in a digital video broadcasting system according to an embodiment of the present disclosure.

FIG. 7 illustrates an example in which bit interleaving is applied for IR in a digital video broadcasting system according to an embodiment of the present disclosure.

Referring to FIG. 7, only the components for generating modulated data for IR in a transmission apparatus constituting a DVB system are illustrated for convenience of description only.

Referring to FIG. 7, N (where N is a positive integer) modulated data generators 710-1 to 710-N may generate modulated data Modulated Data #1~Modulated Data #N, respectively, using an interleaving pattern and a modulation scheme which are set for each of them.

For example, one modulated data generator 710-1 may generate a modulated systematic symbol stream Modulated Data #1 by modulating input coded data received. The remaining (N−1) modulated data generators 710-2 to 710-N may generate at least one modulated parity symbol stream

TABLE 2

| Mod | Col $N_c$ | $N_{ldpc}$ | Twisting parameter $t_c$ | | | | | | | | | | | | | | | |
|---|---|---|---|---|---|---|---|---|---|---|---|---|---|---|---|---|---|---|
| | | | 0 | 1 | 2 | 3 | 4 | 5 | 6 | 7 | 8 | 9 | 10 | 11 | 12 | 13 | 14 | 15 |
| 16-QAM | 8 | 64,800 | 0 | 0 | 2 | 4 | 4 | 5 | 7 | 7 | — | — | — | — | — | — | — | — |
| | | 16,200 | 0 | 0 | 0 | 1 | 7 | 20 | 20 | 21 | — | — | — | — | — | — | — | — |
| 64-QAM | 12 | 64,800 | 0 | 0 | 2 | 2 | 3 | 4 | 4 | 5 | 5 | 7 | 8 | 9 | — | — | — | — |
| | | 16,200 | 0 | 0 | 0 | 2 | 2 | 2 | 3 | 3 | 3 | 6 | 7 | 7 | — | — | — | — |
| 256-QAM | 16 | 64,800 | 0 | 2 | 2 | 2 | 2 | 3 | 7 | 15 | 16 | 20 | 22 | 22 | 27 | 27 | 28 | 32 |
| | 8 | 16,200 | 0 | 0 | 0 | 1 | 7 | 20 | 20 | 21 | — | — | — | — | — | — | — | — |

It is noted in Table 2 that the column twist factor $t_c$ additionally considers the number '$N_c$' of columns of a writing Modulated Data #2~Modulated Data #N corresponding to IR by modulating input coded data received. The order in which the modulated parity symbol streams Modulated Data #2~Modulated Data #N are transmitted may vary.

Each of the N modulated data generators 710-1 to 710-N may include a bit interleaver and a modulator. However, bit interleavers #1~#N constituting each of the N modulated data generators 710-1 to 710-N may be different from each other in terms of their interleaving pattern. The interleaving pattern may be configured or determined based on the writing order for writing coded data and the reading order for reading written coded data.

Modulators #1~#N constituting each of the N modulated data generators 710-1 to 710-N may be different from each other in terms of their modulation scheme. For example, when (N−1) modulated parity symbol streams are generated, lower-order modulation scheme may be used in proportion to the generation order of the modulated parity symbol streams. The N modulated data generators 710-1 to 710-N may be different from each other in terms of the amount of coded data that is input thereto. Furthermore, only some of the output data of the N modulated data generators 710-1 to 710-N may be transmitted.

Figure 8:
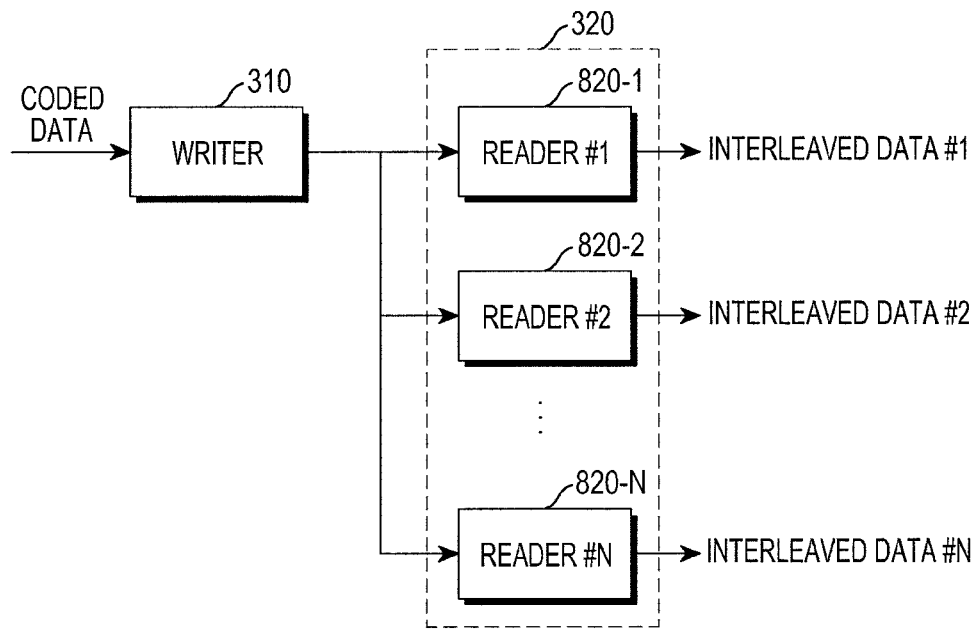
FIG. 8 illustrates a block diagram of a bit interleaver provided to support IR in a transmission apparatus of a digital video broadcasting system according to an embodiment of the present disclosure.

FIG. 8 illustrates a block diagram of a bit interleaver provided to support IR in a transmission apparatus of a digital video broadcasting system according to an embodiment of the present disclosure.

Referring to FIG. 8, the bit interleaver may have a structure in which N readers 820-1 to 820-N may output a plurality of interleaved coded data by sharing coded bits written by a single writer 310. However, the N readers 820-1 to 820-N may have different reading orders. Therefore, the interleaved data Interleaved Data #1~Interleaved Data #N output from the N readers 820-1 to 820-N may be different arrays of coded bit streams.

For example, the interleaved systematic data Interleaved Data #1 output from the reader #1 820-1 may be used for general broadcast. The interleaved parity data Interleaved Data #2~Interleaved Data #N output from the remaining readers #2 820-1~#N 820-N may be used as IR for increasing parity bits. The interleaved data Interleaved Data #2~Interleaved Data #N to be used for IR may correspond to the increasing amount of parity bits.

For example, the interleaved data Interleaved Data #2 output from the reader #2 820-2 may be used as IR for first supporting incremental parity, the interleaved data Interleaved Data #3 output from the reader #3 820-3 may be used as IR for second supporting incremental parity, and the interleaved data Interleaved Data #N output from the reader #N 820-N may be used as IR for N-th supporting incremental parity.

It will be apparent to those of ordinary skill in the art that if the bit interleavers in FIG. 7 are different from each other in terms of the amount of bits input thereto, the writer 310 in FIG. 8 may be differently applied depending on each of the interleaved data Interleaved Data #1 to #N.

Figure 9:
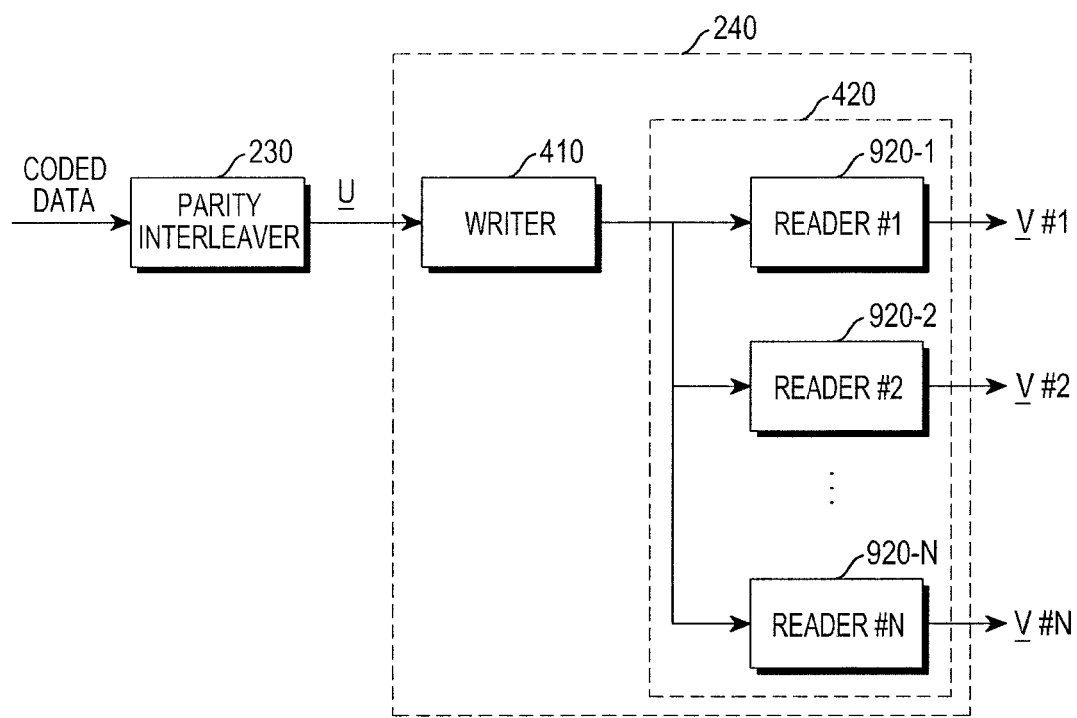
FIG. 9 illustrates another block diagram of a bit interleaver provided to support IR in a transmission apparatus of a digital video broadcasting system according to an embodiment of the present disclosure.

FIG. 9 illustrates another block diagram of a bit interleaver provided to support IR in a transmission apparatus of a digital video broadcasting system according to an embodiment of the present disclosure.

Referring to FIG. 9, the bit interleaver may include a parity interleaver 230 and a column-twist interleaver 240. The parity interleaver 230 may correspond to the parity interleaver 230 in FIG. 2 and the column-twist interleaver 240 may correspond to the column-twist interleaver 240 in FIG. 2.

The column-twist interleaver 240 may have the same structure as the bit interleaver illustrated in FIG. 8. In other words, the column-twist interleaver 240 may have a structure in which N readers 920-1 to 920-N may output a plurality of interleaved coded data V #1~V #N by sharing coded bits written by a single writer 410. An operation of outputting a plurality of interleaved coded data V #1~V #N by the N readers 920-1 to 920-N may be the same as that in FIG. 8, so a detailed description thereof will be omitted.

The bit interleaver illustrated in FIG. 8 may be applied when a parity interleaver is not used and the bit interleaver illustrated in FIG. 9 may be applied when a parity interleaver is used. The bit interleaver provided in the transmission apparatus of a digital video broadcasting system may or may not include the parity interleaver according to the status of the system.

A detailed description will now be made of implementations of reading coded data written in a predetermined memory area to generate interleaved coded data according to an embodiment of the present disclosure.

Figure 10:
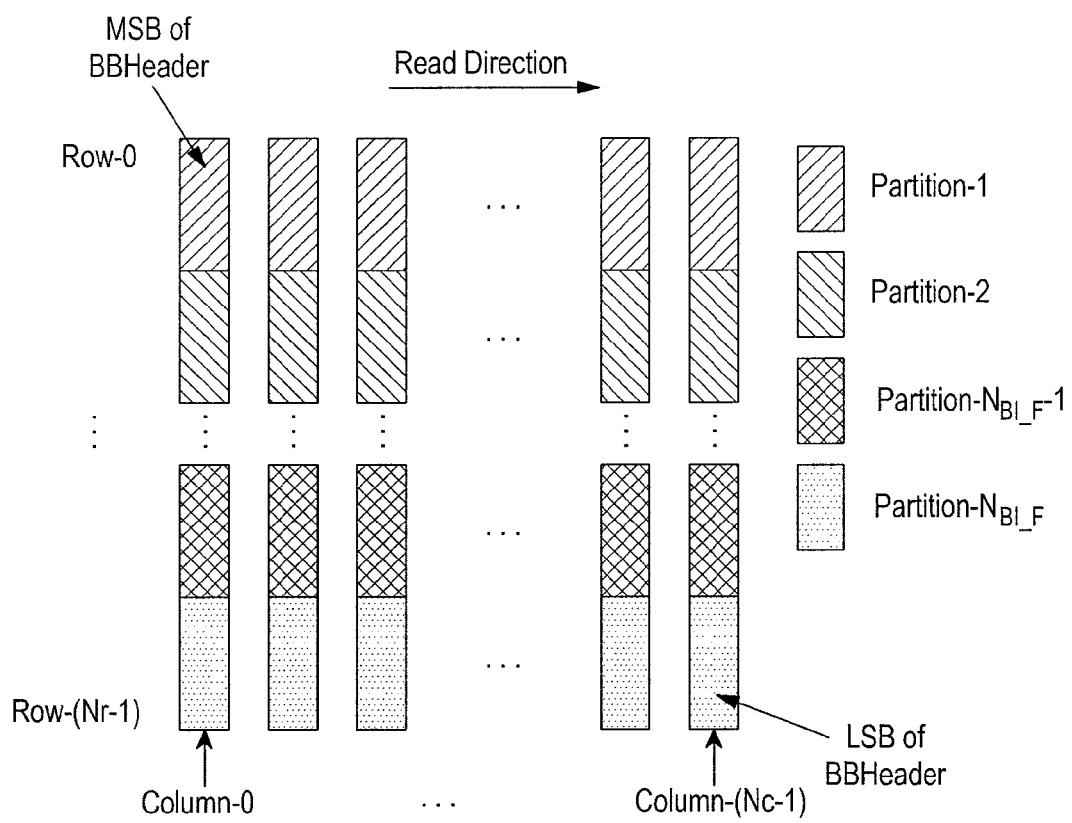
FIG. 10 illustrates an example of a reading operation for interleaving according to an embodiment of the present disclosure.
Figure 11:
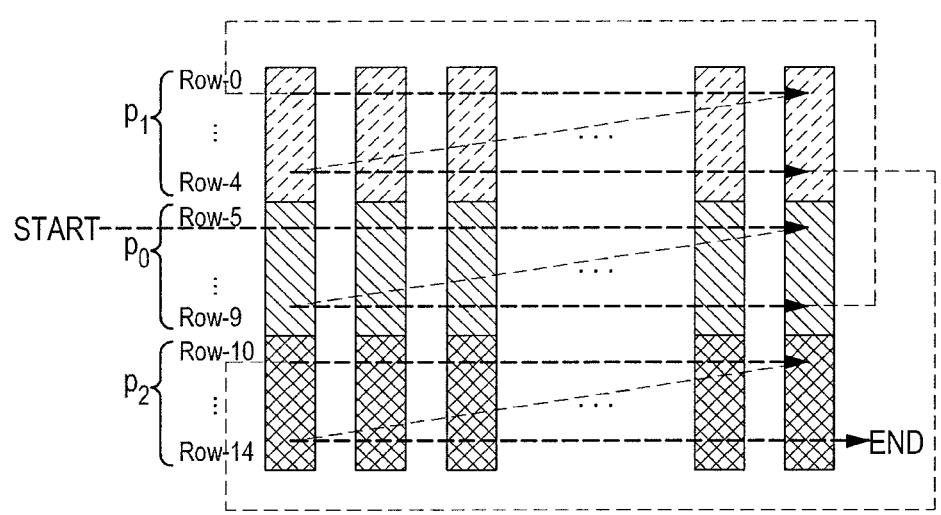
FIG. 11 illustrates an example of performing reading for interleaving using a row partition index according to an embodiment of the present disclosure.
Figure 12:
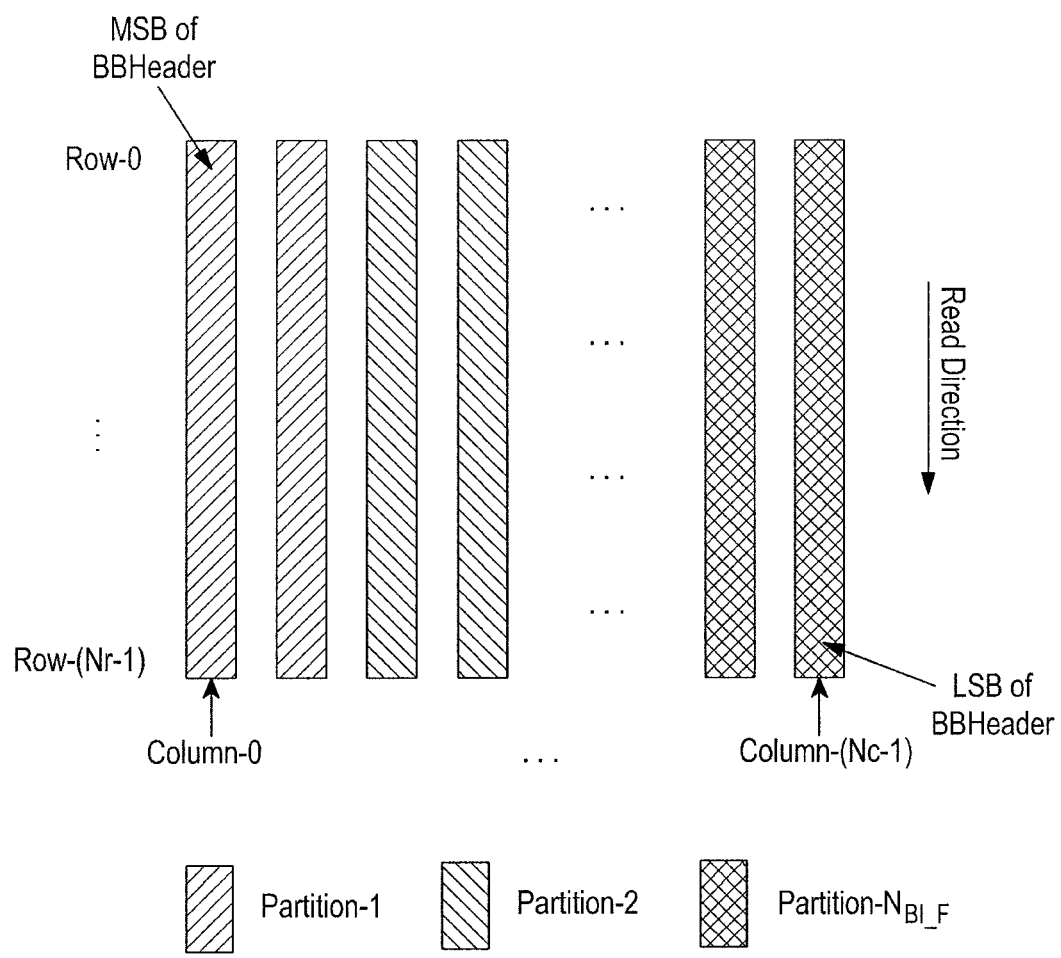
FIG. 12 illustrates another example of a reading operation for interleaving according to an embodiment of the present disclosure.
Figure 13:
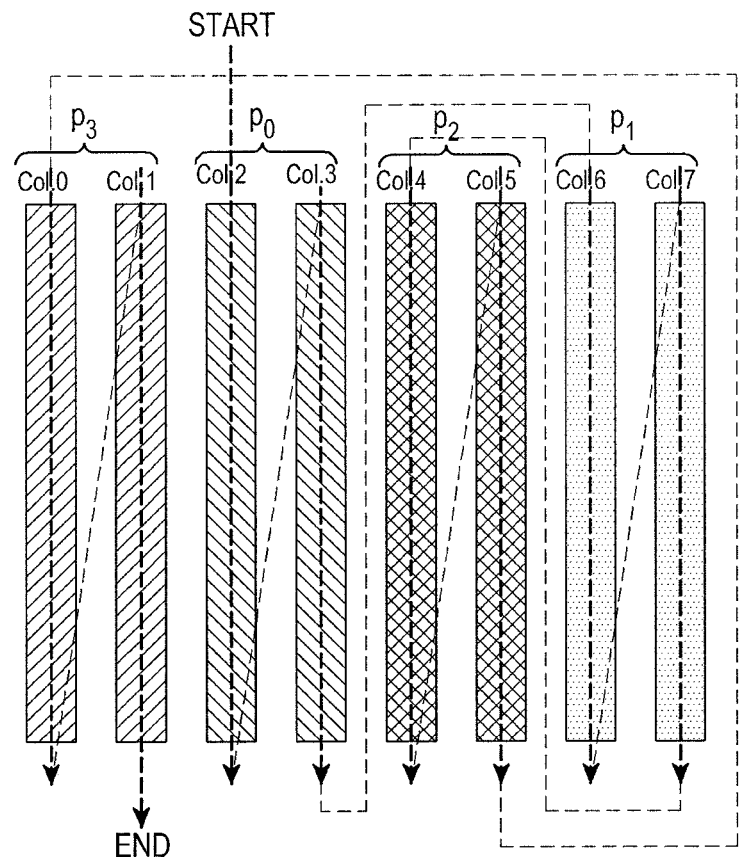
FIG. 13 illustrates an example of performing reading for interleaving using a column partition index according to an embodiment of the present disclosure.

As for the below-described implementations, two schemes having different read directions will be proposed. The first scheme is proposed on the assumption that the read direction is the same as a write direction of coded bits as illustrated in FIGS. 10 and 11. The second scheme is proposed on the assumption that the read direction is different from the write direction of coded bits as illustrated in FIGS. 12 and 13. In other words, the first scheme is implemented on the assumption that coded bits are read on a column basis, and the second scheme is implemented on the assumption that coded bits are read on a row basis.

However, the proposed two schemes may be the same in terms of their parent concept (or superordinate concept) of partitioning a column or a row into a plurality of blocks, and assigning a reading order to each partition (or set) of partitioned columns or rows.

FIG. 10 illustrates an example of a reading operation for interleaving according to an embodiment of the present disclosure.

Referring to FIG. 10, it is assumed that the reading order of coded bits for specified on a row basis and a memory area set up for interleaving may be defined by a predetermined number 'c' of columns and a predetermined number 'r' of rows. Unique column indexes Column-0 to Column-($N_c$−1) may be assigned to each of the predetermined number 'c' of columns and unique row indexes Row-0 to Row-($N_r$−1) may be assigned to each of the predetermined number 'r' of rows. Here, $N_c$ is specified in a range of $0 \le N_c < c-1$, and $N_r$ is specified in a range of $0 \le N_r < r-1$.

In order to define the reading order by a predetermined row partition, a predetermined number 'r' of rows defining a memory area may be partitioned in units of a predetermined number $N_{BI\_P}$. The blocks which are partitioned in units of the predetermined number $N_{BI\_P}$ will be referred to as a 'row partition'. It is assumed that, in FIG. 10, a predetermined number 'r' of rows defining a memory area are partitioned into $N_{BI\_F}$ row partitions Partition-1, Partition-2 . . . and Partition-$N_{BI\_P}$, Partition-$N_{BI\_P}$.

Unique indexes may be assigned to each of the $N_{BI\_F}$ row partitions Partition-1, Partition-2 . . . , Partition-$N_{BI\_P}$, and Partition-$N_{BI\_P}$. An index assigned to each row partition will be referred to as a 'row partition index'. The assigning of the row partition index $p_n$, $0 \le n < N_{BI\_P}-1$ may aim to easily set the reading order.

As a result, the reading order for interleaving may be set using the row partition index ($p_n$, $0 \le n < N_{BI\_P}-1$) that is assigned to each row partition index.

FIG. 11 illustrates an example of performing reading for interleaving using a row partition index according to an embodiment of the present disclosure.

Referring to FIG. 11, it is assumed in FIG. 11 that a memory area in which coded bits are written for interleaving is partitioned into a total of three row partitions in units of five rows. That is, 15 row indexes Row-0 to Row-14 that define a memory area may be partitioned into three partitions in units of five rows. In other words, rows corresponding to the row indexes Row-0 to Row-4 may be partitioned as a first row partition, rows corresponding to the row indexes Row-5 to Row-9 may be partitioned as a second row partition, and rows corresponding to the row indexes Row-10 to Row-14 may be partitioned as a third row partition.

An index specifying a reading order may be assigned to each of the three row partitions. For example, an index $p_1$ corresponding to the second reading order may be assigned to the first row partition, an index $p_0$ corresponding to the first reading order may be assigned to the second row partition, and an index $p_2$ corresponding to the third reading order may be assigned to the third row partition. Therefore, the final set reading order may be an order of the second row partition, the first row partition and the third row partition depending on the order ($p_0$, $p_1$, $p_2$) of indexes specifying them.

If the reading order is set as above, the reading operation for interleaving may be performed along the flow indicated by a dotted line.

For example, coded bits written in each of rows Row-5 to Row-9 (i.e., the second row partition) may be sequentially read and output in the order of row index. Thereafter, coded bits written in each of rows Row-0 to Row-4 (i.e., the first row partition) may be sequentially read and output in the order of row index. Finally, coded bits written in each of rows Row-10 to Row-14 (i.e., the third row partition) may be sequentially read and output in the order of row index.

FIG. 12 illustrates another example of a reading operation for interleaving according to an embodiment of the present disclosure.

Referring to FIG. 12, it is assumed in FIG. 12 that the reading order of coded bits for interleaving is specified on a column basis and a memory area set up for interleaving may be defined by a predetermined number 'c' of columns and a predetermined number 'r' of rows. Unique column indexes Column-0 to Column-($N_c$–1) may be assigned to each of the predetermined number 'c' of columns, and unique row indexes Row-0 to Row-($N_r$–1) may be assigned to each of the predetermined number 'r' of rows. Here, $N_c$ is specified in a range of $0 \leq N_c < c-1$, and $N_r$ is specified in a range of $0 \leq N_r < r-1$.

In order to define the reading order by a predetermined column partition, a predetermined number 'c' of columns defining a memory area may be partitioned in units of a predetermined number $N_{BI\_P}$. The blocks which are partitioned in units of the predetermined number $N_{BI\_P}$ will be referred to as a 'column partition'. It is assumed in FIG. 12 that a predetermined number 'c' of columns defining a memory area are partitioned into $N_{BI\_F}$ column partitions Partition-1, Partition-2 ..., Partition-$N_{BI\_P}$–1, and Partition-$N_{BI\_P}$.

Unique indexes may be assigned to each of the $N_{BI\_F}$ column partitions Partition-1, Partition-2 ..., Partition-$N_{BI\_P}$–1, and Partition-$N_{BI\_P}$. An index assigned to each column partition will be referred to as a 'column partition index'. The assigning of the column partition index $p_n$, $0 \leq n < N_{BI\_P}$–1 may aim to easily set the reading order.

As a result, the reading order for interleaving may be set using the column partition index ($p_n$, $0 \leq n < N_{BI\_P}$–1) that is assigned to each column partition index.

FIG. 13 illustrates an example of performing reading for interleaving using a column partition index according to an embodiment of the present disclosure.

Referring to FIG. 13, it is assumed that a memory area in which coded bits are written for interleaving is partitioned into a total of four column partitions in units of two columns such that 8 column indexes Col. 0 to Col. 7 of a memory area may be partitioned into four column partitions in units of two columns. In other words, columns corresponding to the column indexes Col. 0 and Col. 1 may be partitioned as a first column partition, columns corresponding to the column indexes Col. 2 and Col. 3 may be partitioned as a second column partition, columns corresponding to the column indexes Col. 4 and Col. 5 may be partitioned as a third column partition, and columns corresponding to the columns indexes Col. 6 and Col. 7 may be partitioned as a fourth column partition.

An index specifying a reading order may be assigned to each of the four column partitions. For example, an index $p_3$ corresponding to the fourth reading order may be assigned to the first column partition, an index $p_0$ corresponding to the first reading order may be assigned to the second column partition, an index $p_2$ corresponding to the third reading order may be assigned to the third column partition, and an index $p_1$ corresponding to the second reading order may be assigned to the fourth column partition. Therefore, the final set reading order may be an order of the second column partition, the fourth column partition, the third column partition and the first column partition depending on the order ($p_0$, $p_1$, $p_2$, $p_3$) of indexes specifying them.

If the reading order is set as above, the reading operation for interleaving may be performed along the flow indicated by a dotted line.

For example, coded bits written in each of columns Col. 2 and Col. 3 constituting the second column partition may be sequentially read and output in the order of column index, and then, coded bits written in each of columns Col. 6 and Col. 7 constituting the fourth column partition may be sequentially read and output in the order of column index. Coded bits written in each of columns Col. 4 and Col. 5 constituting the third column partition may be sequentially read and output in the order of column index, and then, coded bits written in each of columns Col. 0 and Col. 1 constituting the first column partition may be sequentially read and output in the order of column index.

Figure 14:
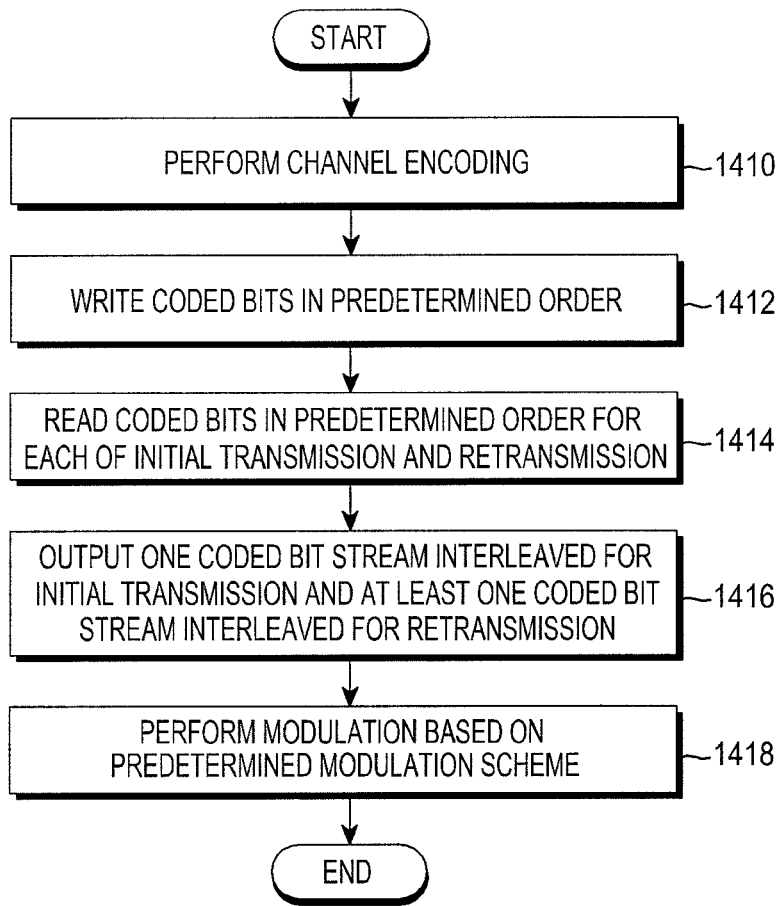
FIG. 14 is a flow diagram of a method for signal transmission performed considering IR in a transmission apparatus of a digital video broadcasting system according to an embodiment of the present disclosure.

FIG. 14 is a flow diagram of a method for signal transmission performed considering IR in a transmission apparatus of a digital video broadcasting system according to an embodiment of the present disclosure.

Referring to FIG. 14, in operation 1410, the transmission apparatus may perform channel encoding on a video signal based on a predetermined channel coding technique. In operation 1412, the transmission apparatus may write a coded bit stream generated by the channel encoding in a memory area having a predetermined size in a predetermined writing order. An example of the operation of writing the coded bit stream in a memory area has been described in detail with reference to FIG. 5.

In operation 1414, the transmission apparatus may read coded bits written in the memory area in a preset reading order. For example, the reading order may be differently set for each of systematic data transmission and at least one parity data transmission for providing IR.

Examples of the operation of reading and outputting coded bits written in the memory area in a set reading order have been described in detail with reference to FIGS. 10 to 13.

In operation 1416, the transmission apparatus may output an interleaved coded systematic bit stream and at least one interleaved coded parity bit stream. For example, a first coded bit stream that is read in a reading order that is set for the systematic data transmission may be output as an interleaved coded systematic bit stream. At least one second coded bit stream that is read in a reading order that is set for IR may be output as an interleaved coded parity bit stream.

The interleaved coded systematic bit stream is a bit stream that must be transmitted during broadcast, but the interleaved coded systematic bit stream should be distinguished from a systematic bit stream that is output by encoding. The interleaved coded parity bit stream is a bit stream to be transmitted as IR and the interleaved coded parity bit stream should be distinguished from a parity bit stream that is output by encoding.

In operation 1418, the transmission apparatus may modulate the one interleaved coded systematic bit stream and the at least one interleaved coded parity bit stream using a predetermined modulation scheme. The transmission apparatus may output one modulated systematic symbol stream and at least one modulated parity symbol stream. The modulation scheme for modulating the interleaved coded systematic bit stream may be equal to, or different from the modulation scheme for modulating the interleaved coded parity bit stream. If the interleaved coded parity bit stream is plural in number, the modulation scheme for modulating each interleaved coded parity bit stream may also be equal to, or different from each other.

Figure 15:
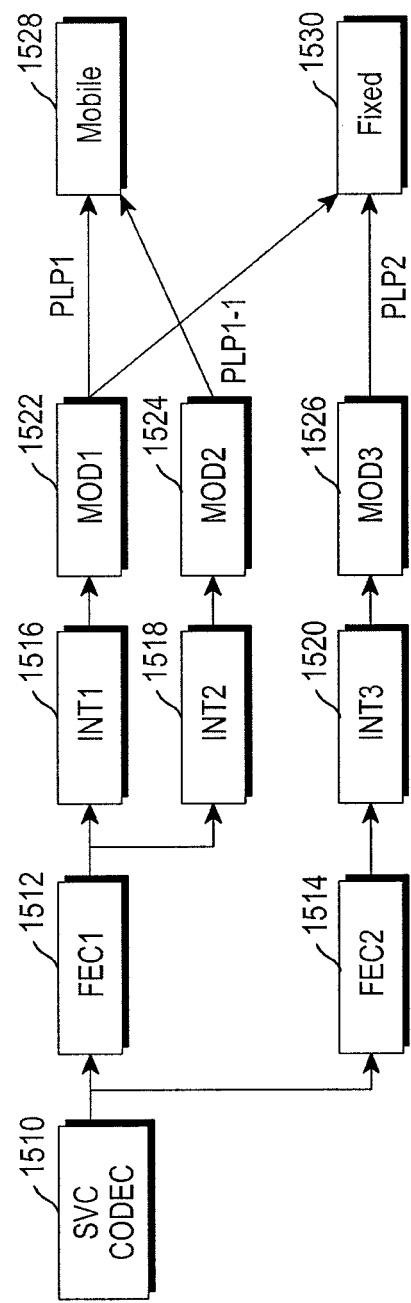
FIG. 15 illustrates an example of a digital video broadcasting system according to an embodiment of the present disclosure.

FIG. 15 illustrates an example of a digital video broadcasting system according to an embodiment of the present disclosure.

Referring to FIG. 15, for data corresponding to Mobile 1528, a video signal output from a Scalable Video Codec (SVC) codec 1510 may be encoded by one FEC1 1512 the encoded coded bit streams may be interleaved by interleavers 1516 and 1518, and the interleaved bit streams may be modulated by modulators 1522 and 1524, respectively.

For data corresponding to Fixed 1530, a video signal output from the SVC codec 1510 may be encoded by FEC2 1514, the coded bit stream may be interleaved by interleaver 1520, the interleaved stream may be modulated by modulator 1526.

The Mobile 1528 may contribute to a reduction in the complexity of a receiver. The Fixed 1530 may contribute to an increase in the diversity.

As is apparent from the foregoing description, according to an embodiment of the present disclosure, excellent transmission efficiency may be ensured by supporting interleaving for IR generation in a digital video broadcasting system. In addition, as interleaving in the digital video broadcasting system aims not at the spread of bits in a channel, but at seamless mapping, a write direction and a read direction of coded bits may coincide with each other, contributing to the prevention of performance degradation.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for bit-interleaving coded bits for incremental redundancy (IR) transmission in a transmission apparatus of a digital video broadcasting system, the method comprising:
   writing the coded bits in a memory area having a predetermined size;
   partitioning a predetermined number of rows defining the memory area into an arbitrary number of row partitions, and arbitrarily arranging row partition indexes which are assigned to row partitions determined by the partitioning, to thereby set a reading order;
   selecting a reading target row in the same order as a writing order for rows constituting a row partition of a specific row partition index that is selected in the reading order; and
   outputting the selected reading target row written in the memory area into one coded bit stream interleaved for normal transmission and at least one coded bit stream interleaved for at least one IR transmission,
   wherein the reading order is differently set for each of the normal transmission and at least one IR transmission.

2. The method of claim 1, wherein the outputting of the one coded bit stream interleaved for the normal transmission and the at least one coded bit stream interleaved for at least one IR transmission comprises:
   reading the coded bits written in the memory area based on a normal reading order that is set for the normal transmission and outputting the one coded bit stream; and
   reading the coded bits written in the memory area based on an IR reading order that is different from the normal reading order and is uniquely set for each of the at least one IR transmission, and outputting the at least one coded bit stream,
   wherein, if the memory area is defined by a predetermined number of columns and the predetermined number of rows, the normal reading order and the IR reading order are defined by a column index corresponding to the predetermined number of columns or a row index corresponding to the predetermined number of rows.

3. The method of claim 1, wherein the outputting of the one coded bit stream interleaved for the normal transmission and the at least one coded bit stream interleaved for at least one IR transmission comprises outputting coded bits written in the selected reading target row using a column index corresponding to the predetermined number of columns defining the memory area.

4. A method for bit-interleaving coded bits for incremental redundancy (IR) transmission in a transmission apparatus of a digital video broadcasting system, the method comprising:
   writing the coded bits in a memory area having a predetermined size;
   partitioning a predetermined number of columns defining the memory area into an arbitrary number of column partitions, and arbitrarily arranging column partition indexes which are assigned to column partitions determined by the partitioning, to thereby set a reading order;
   selecting a reading target column in the same order as a writing order for columns constituting a column partition of a specific column partition index that is selected in the reading order; and
   outputting the selected reading target column written in the memory area into one coded bit stream interleaved for normal transmission and at least one coded bit stream interleaved for at least one IR transmission,
   wherein the reading order is differently set for each of the normal transmission and at least one IR transmission.

5. The method of claim 4, wherein the outputting of the one coded bit stream interleaved for the normal transmission and the at least one coded bit stream interleaved for at least one IR transmission comprises outputting coded bits written in the selected reading target column using a row index corresponding to the predetermined number of rows defining the memory area.

6. An apparatus for bit-interleaving coded bits for incremental redundancy (IR) transmission in a digital video broadcasting system, the apparatus comprising:
an interleaver configured to:
write the coded bits in a memory area having a predetermined size,
partition a predetermined number of rows defining the memory area into an arbitrary number of row partitions and arbitrarily arrange row partition indexes which are assigned to row partitions determined by the partitioning to thereby set the reading order,
select a reading target row in the same order as a writing order for rows constituting a row partition of a specific row partition index that is selected in the reading order, and output the selected reading target row written in the memory area into one coded bit stream interleaved for the normal transmission and at least one coded bit stream interleaved for at least one IR transmission,
wherein the reading order is differently set for each of the normal transmission and at least one IR transmission; and
a modulator configured to modulate the coded bits interleaved by the interleaver.

7. The apparatus of claim 6, wherein the interleaver is configured to:
read the coded bits written in the memory area based on a normal reading order that is set for the normal transmission and output the one coded bit stream; and
read the coded bits written in the memory area based on an IR reading order that is different from the normal reading order and is uniquely set for each of the at least one IR transmission, and output the at least one coded bit stream,
wherein if the memory area is defined by a predetermined number of columns and the predetermined number of rows, the normal reading order and the IR reading order are defined by a column index corresponding to the predetermined number of columns or a row index corresponding to the predetermined number of rows.

8. The apparatus of claim 6, wherein the interleaver is configured to output coded bits written in the selected reading target row using a column index corresponding to the predetermined number of columns defining the memory area.

9. An apparatus for bit-interleaving coded bits for incremental redundancy (IR) transmission in a digital video broadcasting system, the apparatus comprising:
an interleaver configured to:
write the coded bits in a memory area having a predetermined size,
partition a predetermined number of columns defining the memory area into an arbitrary number of column partitions and arbitrarily arrange column partition indexes which are assigned to column partitions determined by the partitioning to thereby set the reading order,
select a reading target column in the same order as a writing order for columns constituting a row partition of a specific column partition index that is selected in the reading order, and output the selected reading target column written in the memory area into one coded bit stream interleaved for the normal transmission and at least one coded bit stream interleaved for at least one IR transmission,
wherein the reading order is differently set for each of the normal transmission and at least one IR transmission; and
a modulator configured to modulate the coded bits interleaved by the interleaver.

10. The apparatus of claim 9, wherein the interleaver is configured to output coded bits written in the selected reading target column using a row index corresponding to the predetermined number of rows defining the memory area.

11. An apparatus for generating data in a digital video broadcasting system, the apparatus comprising:
an encoder configured to encode input data;
an interleaver configured to interleave bits encoded by the encoder; and
a modulator configured to modulate coded bits interleaved by the interleaver,
wherein the interleaver includes:
a memory including a writing area having a predetermined number of columns and a predetermined number of rows; and
a controller configured to:
write the coded bits in the memory based on a writing order that is defined by a column index corresponding to the predetermined number of columns and a row index corresponding to the predetermined number of rows, and
output coded bits written in the memory in a reading order that is assigned to each column or row partition determined by partitioning the columns or the rows considering a read direction of coded bits written in the memory, and
wherein the controller is configured to select a reading target row in the same order as a writing order for rows constituting a row partition of a specific row partition index that is selected in the reading order.

12. The apparatus of claim 11, wherein the controller is configured to:
if reading of coded bits written in the memory is performed in a row direction, partition the predetermined number of rows into a set number of row partitions, interleave row partition indexes which are assigned to row partitions determined by the partitioning, and output coded bits written in the memory in order of the interleaved row partition indexes; and
if reading of coded bits written in the memory is performed in a column direction, partition the predetermined number of columns into a set number of column partitions, interleave column partition indexes which are assigned to column partitions determined by partitioning, and output coded bits written in the memory in order of the interleaved columns partition indexes.

13. The apparatus of claim 11, wherein the interleaver is configured to output coded bits written in the selected reading target row using the column index.

* * * * *